(12) United States Patent
Ramalingam

(10) Patent No.: US 10,528,462 B2
(45) Date of Patent: Jan. 7, 2020

(54) STORAGE DEVICE HAVING IMPROVED WRITE UNIFORMITY STABILITY

(71) Applicant: Intel Corporation, Santa Clara, CA (US)

(72) Inventor: Anand S. Ramalingam, Beverton, OR (US)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 15/276,696

(22) Filed: Sep. 26, 2016

(65) Prior Publication Data

US 2018/0088810 A1     Mar. 29, 2018

(51) Int. Cl.
G06F 12/02     (2006.01)
G06F 3/06     (2006.01)

(52) U.S. Cl.
CPC ........ *G06F 12/0246* (2013.01); *G06F 3/0652* (2013.01); *G06F 3/0659* (2013.01); *G06F 3/0679* (2013.01); *G06F 2212/7211* (2013.01)

(58) Field of Classification Search
CPC .... G06F 3/0604; G06F 3/0608; G06F 3/0616; G06F 3/0652; G06F 3/0659; G06F 3/0679; G06F 2212/1036; G06F 2212/1044; G06F 2212/214; G06F 2212/7025; G06F 2212/7211; G06F 12/0246

See application file for complete search history.

(56) References Cited

U.S. PATENT DOCUMENTS

| 9,201,789 B1 * | 12/2015 | Kang | G06F 12/0246 |
| 2011/0078402 A1 | 3/2011 | Sato | |
| 2012/0151124 A1 * | 6/2012 | Baek | G06F 12/0246 711/103 |
| 2012/0191927 A1 | 7/2012 | Gorobets et al. | |
| 2013/0117497 A1 * | 5/2013 | Cui | G06F 12/121 711/103 |
| 2014/0181370 A1 * | 6/2014 | Cohen | G06F 12/0246 711/103 |
| 2014/0181434 A1 * | 6/2014 | Chau | G06F 12/16 711/162 |
| 2016/0092117 A1 | 3/2016 | Ramalingam et al. | |

(Continued)

FOREIGN PATENT DOCUMENTS

WO     2013048470 A1     4/2013

OTHER PUBLICATIONS

International Search Report and Written Opinion for PCT Patent Application No. PCT/US17/45618, dated Mar. 29, 2018, 10 pages.

*Primary Examiner* — Nanci N Wong

(74) *Attorney, Agent, or Firm* — Compass IP Law PC

(57) ABSTRACT

A machine readable storage medium containing program code that when processed by a processor causes a method to be performed a method is described. The method includes executing a wear leveling routine by servicing cold data from a first queue in a non volatile storage device to write the cold data. The method also includes executing a garbage collection routing by servicing valid data from a second queue in the non volatile storage device to write the valid data. The method also includes servicing host write data from a third queue in the non volatile storage device to write the host write data wherein the first queue remains fixed and is serviced at a constant rate so that a runtime size of the third queue is not substantially affected by the wear leveling routine.

20 Claims, 10 Drawing Sheets

(56) References Cited

U.S. PATENT DOCUMENTS

| | | |
|---|---|---|
| 2016/0162416 A1 | 6/2016 | Boyd et al. |
| 2016/0179376 A1 | 6/2016 | Ramalingam |
| 2016/0179401 A1 | 6/2016 | Zhang et al. |
| 2016/0321171 A1* | 11/2016 | Kanno ................ G06F 12/0246 |

* cited by examiner

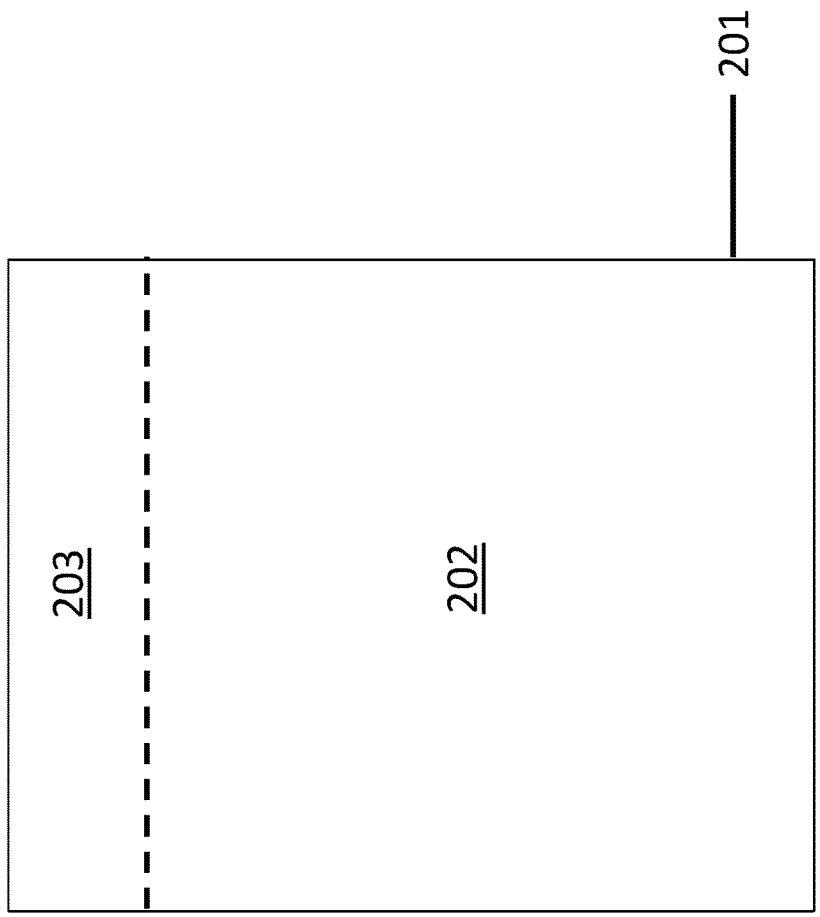

US 10,528,462 B2

STORAGE DEVICE HAVING IMPROVED WRITE UNIFORMITY STABILITY

FIELD OF INVENTION

The field of invention pertains generally to the computing sciences, and, more specifically, to a storage device having improved write uniformity stability.

BACKGROUND

Computing systems typically include non volatile mass storage to store sectors or blocks of data and program code. A pertinent issue in many computer systems is the performance of the mass storage. Here, as is understood in the art, a computing system operates by executing program code stored in main memory. Thus, transfers of large amounts of data and program code between main memory and mass storage are part of the normal operation of a computing system as the data and code that are currently needed for software execution are read from mass storage and written into main memory while large amounts of data and program code that are not currently needed for software execution are read from main memory and written into mass storage. Finding ways to improve mass storage performance is therefore a motivation of computing system engineers.

FIGURES

A better understanding of the present invention can be obtained from the following detailed description in conjunction with the following drawings, in which:

FIG. 2 shows overprovisioning of an SSD device (prior art);

DETAILED DESCRIPTION

A solid state drive (also referred to as a solid state disk) device, as is known in the art, is often used as a direct replacement for a hard disk drive in a computing system. As such, SSD devices are commonly used as mass non volatile storage device that, e.g., accepts sectors or blocks of information from a host (such as a platform complex composed of one or more central processing unit (CPU) cores, main memory controller, system memory and peripheral control hub) for writing into the device, and, responds to read requests issued by the host to the SSD device.

Hard disk drives traditionally store information on one or more platters of magnetic material. Similar to a record player, the platters are continuously rotated and one or more read/write heads moves back and forth over the platters to read/write data from/to different tracks located at different radial locations of the platters. By contrast, SSD devices store information in non volatile memory devices such as a plurality of FLASH memory semiconductor chips. With semiconductor chip minimum feature sizes currently in the realm of tens of nanometers, FLASH storage cells can be made with a density that is somewhat comparable to magnetic hard drive storage but without the size, cost and power inefficiencies associated with the physical rotation of platters and the movement of a read/write head. As such, SSD devices have enjoyed significant penetration into mass storage markets over the last decade or so.

Figure 1A:
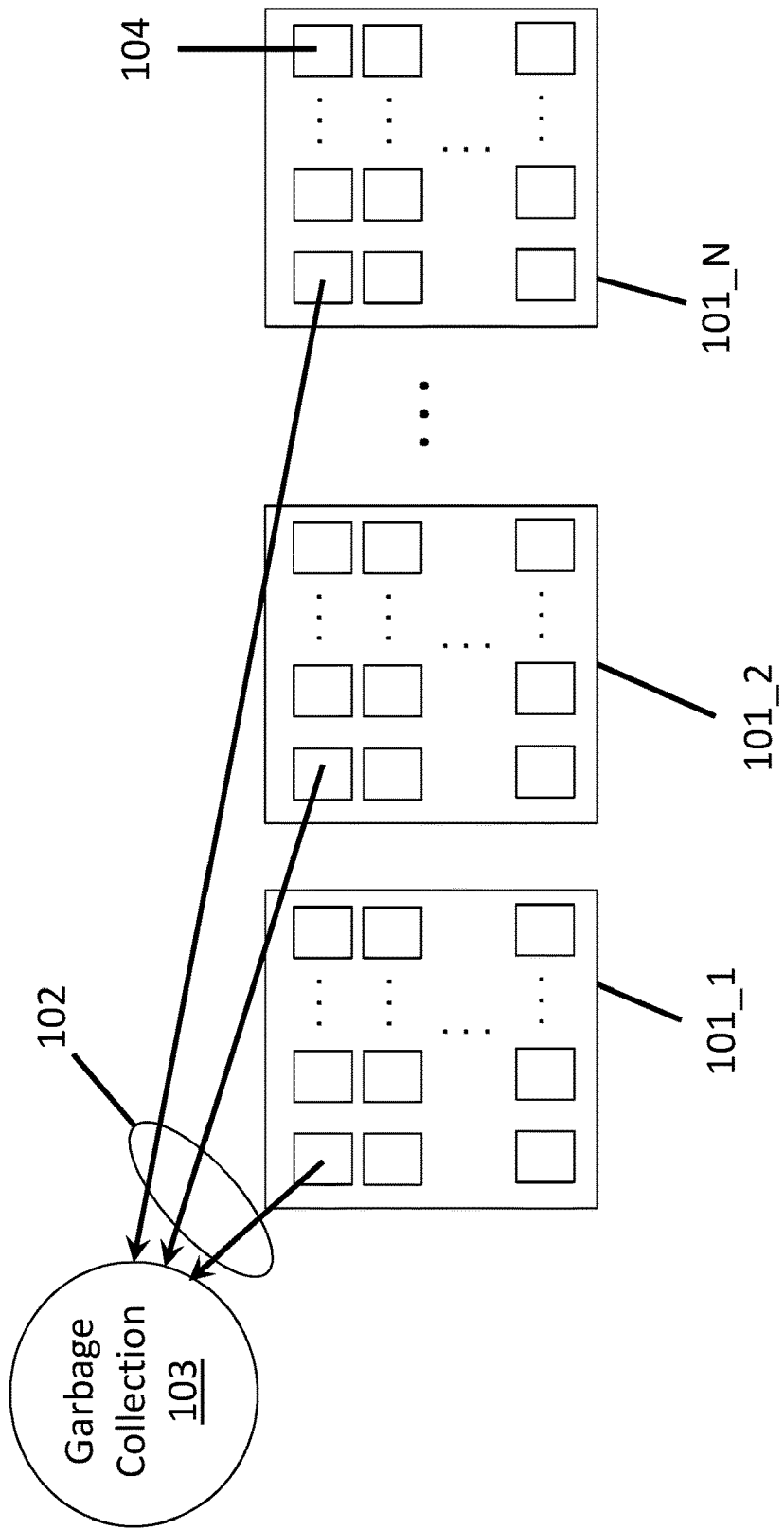
FIGS. 1a and 1b show a garbage collection process (prior art)

FIG. 1a shows a high level view 100 of solid state disk (SSD) device and a background process that SSD devices internally execute, referred to as "garbage collection". As observed in FIG. 1a, the SSD device 100 includes a plurality of non volatile memory chips 101_1 through 101_N (e.g., FLASH memory chips). As is known in the art, FLASH memory cells need to be erased before they are written to. That is, before a sector of write information, e.g., from a host, can be written into any of the storage cells of the memory devices 101, the specific cells that are targeted for storing the data must have been erased prior to attempting to write the new data to them.

Typically, the granularity at which FLASH cells are erased ("erase block") is larger than the granularity at which FLASH cells are written to or read from ("sector" or "block"). Thus, for instance, a single erase block's worth of storage cells is sufficient to store multiple sectors or blocks. The storage capacity of each individual memory device 101_1 through 101_N corresponds to multiple erase blocks 104 (for simplicity, only one of the erase blocks 104 is actually labeled in FIG. 1a). As just one example, currently, the storage capacity of a single FLASH memory chip can be broken down into hundreds of erase blocks.

In order to ensure sufficient write bandwidth of the SSD device 100 from the perspective of the host that is sending write data to the SSD device 100, the SSD device is designed, ideally, to ensure that a sufficient supply of erase blocks worth of information have been erased and are readily available for receiving write data at any moment in time. Said another way, if the SSD device was not pro-active in ensuring a supply of already erased erase blocks was not readily available, the host might be forced to stall or otherwise delay its sending of write data to the SSD device.

The pro-active process by which an SSD device attempts to ensure an available supply of erased erase blocks is referred to as garbage collection 103. In the particular garbage collection 103 approach depicted in FIG. 1a, a group of erase blocks referred to as a "band" are read from the memory devices 101_1 through 101_N. Here, as just one example, a band corresponds to a group of erase blocks across the memory devices 101_1 through 101_N having the same location in each memory device 101_1 through 101_N. As observed in FIG. 1a, the garbage collection process 103 is reading 102 the content of a particular band of erase blocks whose respective locations in their respective memory devices corresponds to the upper left corner of each memory device 101_1 through 101_N as drawn in FIG. 1a.

With the reading 102 of the band of erase blocks, the garbage collection process next proceeds to gather the valid information from them. Here, with the complication that FLASH device cells need to be erased before they can be written to, to avoid the time penalty of having to wait for an erase procedure prior writing, an SSD device will typically write a new version of data item into a different storage location than where its previous version is stored. As such, upon the writing of the new version, the old version is declared invalid. Thus, over time, a respectable percentage of the storage cells within an SSD device are invalid while the remaining percentage is valid.

Figure 1B:
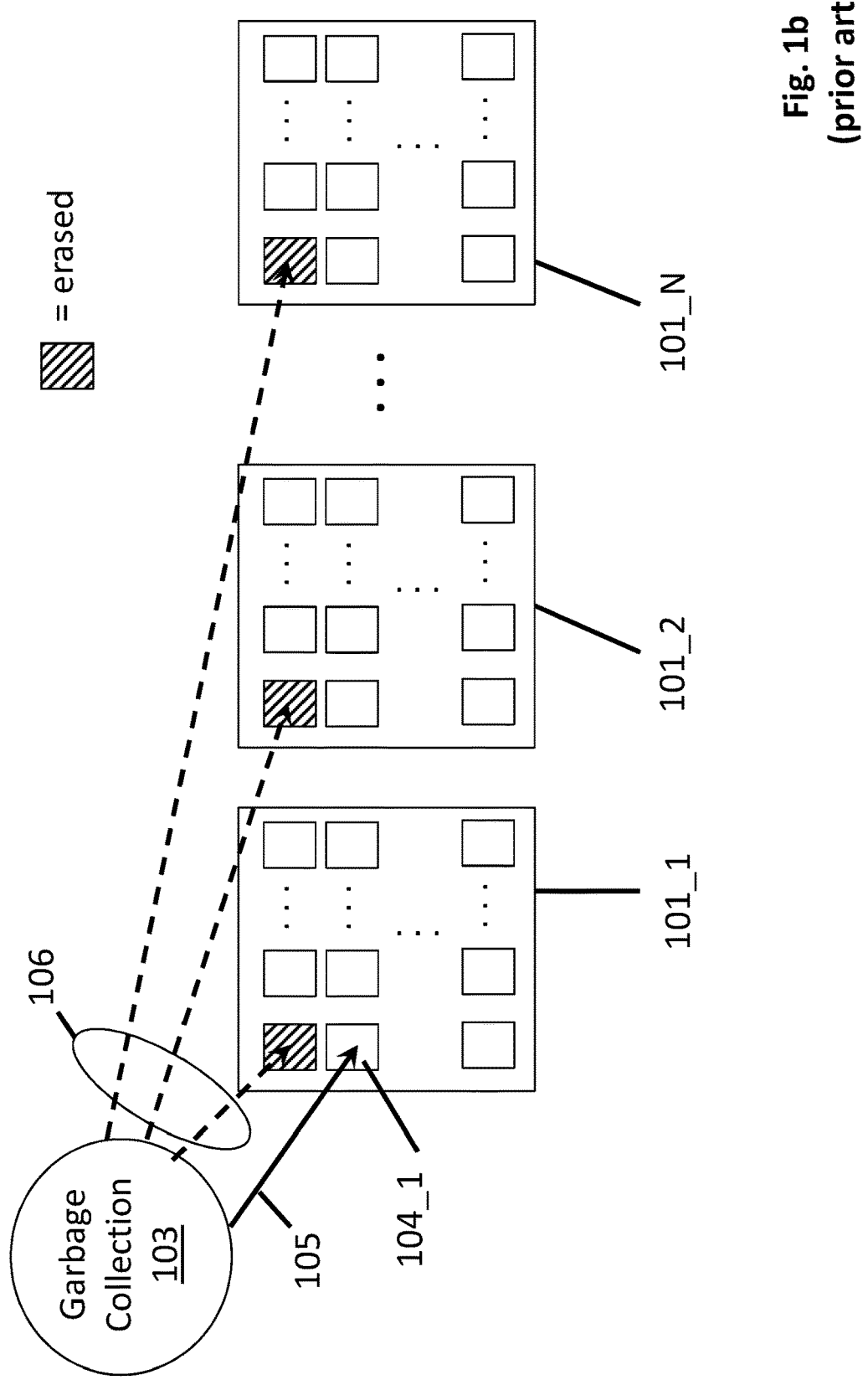

Therefore, upon reading 102 the content of a band of erase blocks, referring to FIG. 1b, the garbage collection process will gather the valid content from the erase blocks and write 105 the valid content in a free (previously erased) erase block. As observed in FIG. 1b, the garbage collection process 103 has collected the valid information from the band of FIG. 1a and written the valid content into previously erased erase block 104_1. Here, the SSD device maintains an internal FLASH translation table (FLT) that correlates which logical block addresses (LBAs) associated with host requests map to which specific physical locations within the SSD device where the sectors/blocks of the LBAs are stored.

With the valid information of the band having been accounted for, the garbage collection process 103 is also free to erase 106 the band as depicted in FIG. 1b. The erasure 106 of the band is also referred to as reclaiming the band's corresponding erase blocks. Ideally, the rate at which the host can send write information to the SSD is about the same as the rate at which the SSD device is able to erase/reclaim bands of erase blocks. However, the writing of the valid data 105 by the garbage collection process 103 represents an inefficiency in the sense that write data from the host sits and waits while the valid data is being written 105.

This inefficiency is monitored by the SSD device through a parameter referred to as "write amplification". Write amplification is the ratio of garbage collection valid data writes ($W_{GC}$) and host data writes ($W_H$) to host data writes. That is, write amplification is $(W_{GC}+W_H)/W_H$. Referring to FIG. 1b, the write of the valid data 105 by the garbage collection process 103 corresponds to the $W_{GC}$ component of write amplification. Here, note that if large amounts of valid data are to be written by the garbage collection process 103, write amplification increases which reflects decreasing efficiency or ability by the SSD device to satisfy the write demands of the host.

For example, if instead of one erase block 104_1 being sufficient to receive the valid data as depicted in FIG. 1b, consider a situation where two or three or more erase blocks are needed to retain all the valid data from the garbage collection process 103. In this case, the SSD device would spend even more time writing valid data from the garbage collection process 103 at the expense of queuing delay to the host's write traffic. In this situation, write amplification increases reflecting less efficient operation of the SSD device from the perspective of the host device.

Firmware that is executed by the SSD (in various embodiments the SSD firmware also executes the garbage collection process 103), monitors the write amplification so it can tweak the respective sizes of internal buffers within the SSD for keeping garbage collection write data and host write data respectively in response. Here, the ability to write any kind of data into the plurality of memory devices 101_1 through 101_N is generally limited to a fixed maximum bandwidth. The SSD device includes, e.g., a first internal buffer for queuing valid data from garbage collection to be written and a second internal buffer for queuing host write data to be written. The total size of the two buffers at any time should correspond to the SSD's maximum write bandwidth into the memory devices.

Thus, if write amplification increases, the SSD firmware will increase the size of the first internal buffer (garbage collection write data) and decrease the size of second internal buffer (host write data). Likewise, if write amplification decreases, the SSD firmware will decrease the size of the first internal buffer and increase the size of the second internal buffer. Both buffers can be implemented, e.g., on local dynamic random access memory (DRAM) within the SSD device that is serviced (read from) at a constant rate by a controller within the SSD to read out the queued data for imminent writing.

Here, different portions of the DRAM memory are allocated for the two different buffers. To increase the size of one buffer at the expense of the other, a portion of the DRAM space allocated for the buffer being reduced in size is re-allocated to the other portion of the DRAM space allocated for the buffer being increased in size. In this manner, the SSD device tweaks the size of the two pairs in response to monitored write amplification. The total size of the DRAM approximately corresponds to the internal bandwidth of the SSD device's ability to write data into its memory devices. By keeping the size of the internal DRAM limited in view of the SSD's internal write bandwidth, the average queuing delay of write data can be controlled. Note however that changes in write amplification are ultimately a function of the data write patterns of the host device.

A concern however is the "write uniformity" observed by the host. If the size of the second buffer (for host write data) swings widely over time in response to write amplification changes, the host will experience widely different service rates over time from the SSD device (e.g., marked as widely different rates at which write requests sent by the host are accepted by the SSD device). Thus another common design point of SSD devices is the presence of "overprovisioning" which has the effect of smoothing out fluctuations in write uniformity from changes in write amplification.

FIG. 3 illustrates write provisioning at a high level. Here, the total storage capacity of all the FLASH memory devices within the SSD is depicted as area 201. However, the SSD is designed to only accept write data from the host that can total no more than area 202. That is, the SSD has greater storage capacity 201 than what the host is permitted to write to it in total 202. Thus, for instance, when the SSD reports its storage capacity to the host upon being plugged in or upon boot-up, the SSD informs the host that its storage capacity is an amount that corresponds to area 202 and not area 203. So told, the host will understand it cannot ask the SSD to store any more data than an amount that corresponds to area 202.

As such, an extra amount of storage capacity, represented by area 203 in FIG. 2, is maintained within the SSD. The presence of the extra oversubscription storage space 203 helps mitigate wild swings in write uniformity owing to write amplification changes. That is, with there generally being more total storage space than is actually needed at any time, the SSD should be able to avoid having to constrict the size of the buffer that holds host write requests to a size that is so small the host will notice an unacceptably lower or different ability to service its requests. Write uniformity should be more constant/stable and the SSD should be able to accept write requests at approximately the same rate it can reclaim erase blocks.

Further problems exist however in that the oversubscription storage capacity 203 has an associated cost (of additional FLASH memory chips per SSD) and other background processes write to the FLASH memory devices which can still disrupt write uniformity. Here, generally, the FLASH memory devices are the most expensive units in the SSD. Having to add additional FLASH memory devices whose storage capacity is not reflected in the supported capacity of the SSD corresponds to a significant manufacturing cost inefficiency of the SSD.

Figure 3A:
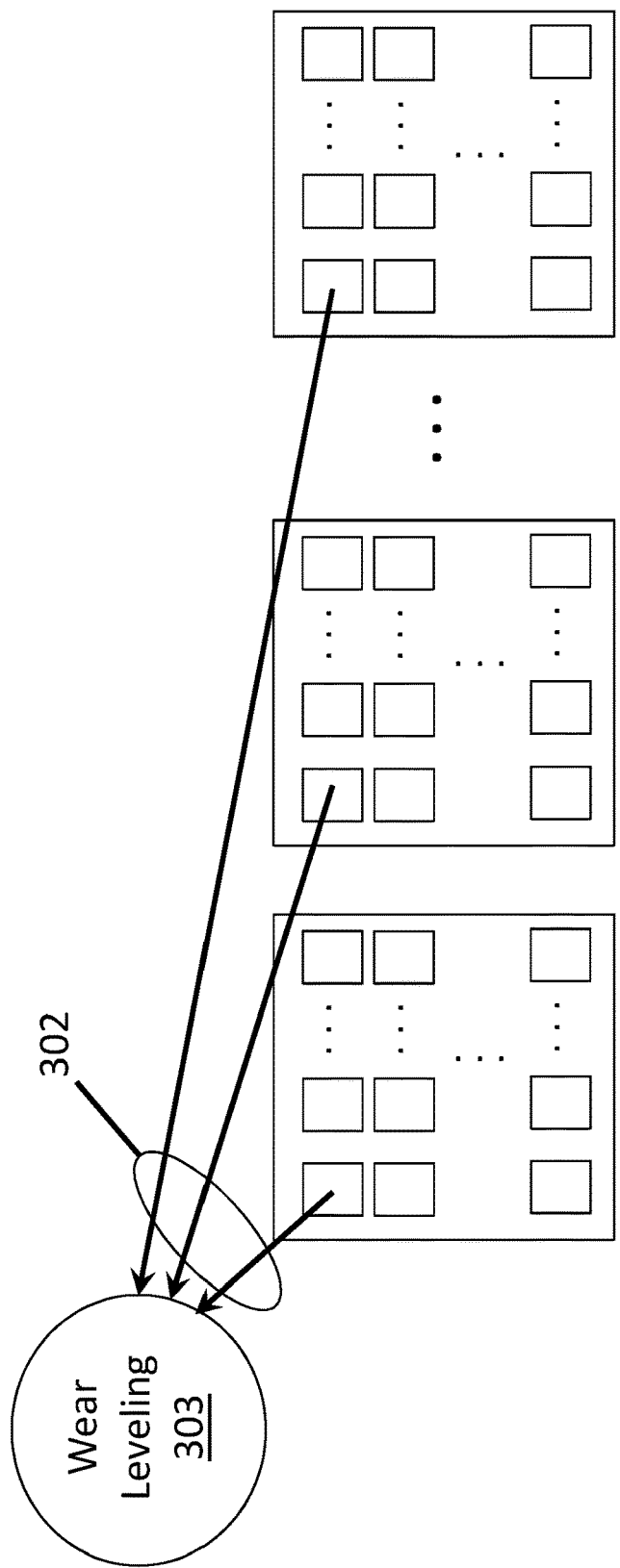
FIGS. 3a and 3b show a wear leveling process (prior art)
Figure 3B:
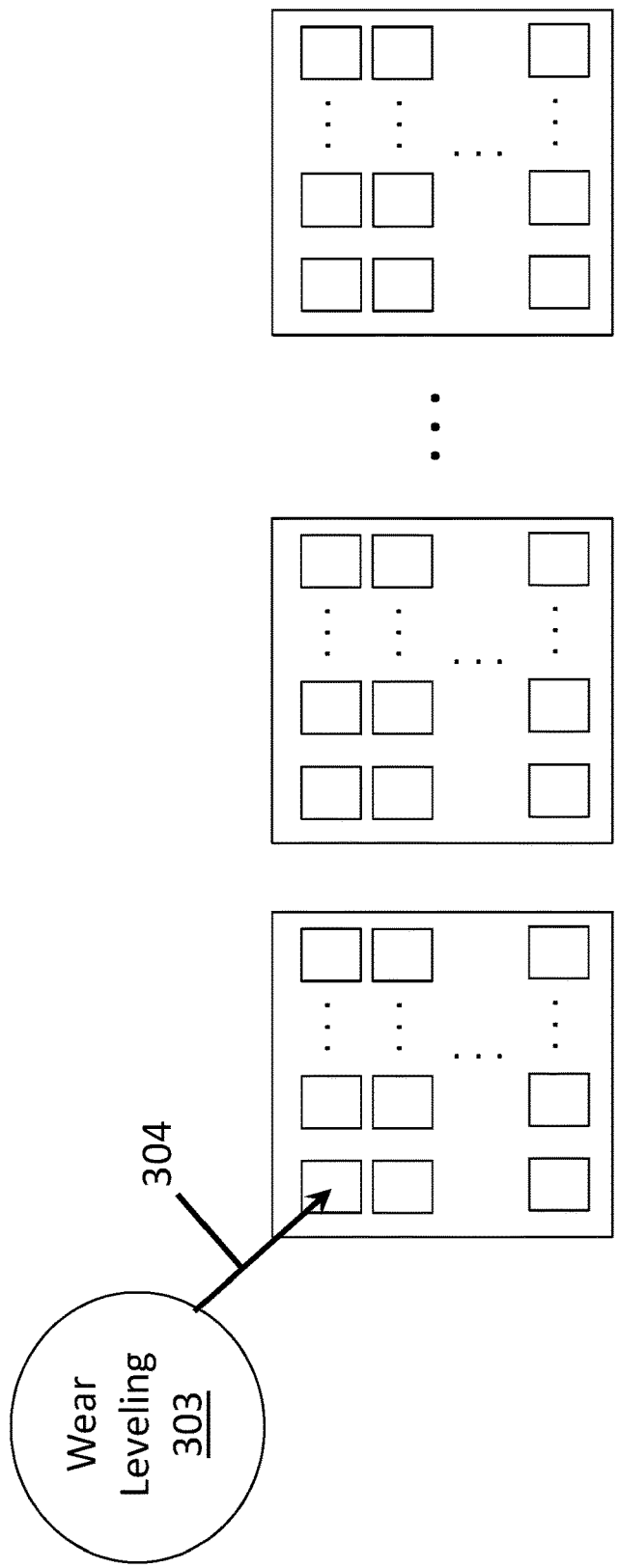

Additionally, as observed in FIGS. 3a and 3b, "wear leveling" can also disrupt the write uniformity of the SSD. As is known in the art, data that is being kept in a FLASH storage cell can be corrupted or the data can otherwise be lost if the data is not accessed sufficiently frequently. Referring to FIG. 3a, SSD wear leveling firmware 303 monitors which storage locations in the FLASH memory devices are not being accessed frequently enough and physically reads 302 their data content to protect the data.

Referring to FIG. 3b, the wear leveling firmware 303 then proceeds to store 304 the data into FLASH memory locations that have been accessed more frequently. Data that has shown a propensity to be written to more frequently is then, e.g., subsequently written into the (cold) cells that the data was just read from. By moving data around in this fashion, all cells of all FLASH memory devices should receive sufficient access activity such that no data losses occur. As depicted in FIGS. 3a and 3b, wear leveling is also performed at band granularity. That is, referring to FIG. 3a, the cold data from an entire band is read 302 from their respective cells and written back 304 as depicted in FIG. 3b.

A problem is that wear leveling can exacerbate the write amplification and associated write uniformity challenges discussed above with respect to garbage collection. That is, with the writing of a band's worth of cold data 304 (and the writing of corresponding hot data back into the cold cells), additional writes are being made into the FLASH storage devices that can affect the SSD's ability to service the host. In one prior art SSD device, if a decision to perform wear leveling is made while garbage collection is in process, the garbage collection process is suspended in favor of the wear leveling process. After completion of the wear leveling, the garbage collection process resumes until completion. In this instance, an extended period of time can elapse in which no host writes are performed.

Recalling the aforementioned local DRAM buffers used to handle the garbage collection write data and the host write data, the sequence of starting garbage collection and then suspending it to perform wear leveling only to resume garbage collection can result in the (second) buffer used to hold host writes becoming undesirably small. Here, wear leveling data may be given its own (a third) buffer in the local DRAM rather than be placed in the (first) garbage collection buffer in order to avoid distorting the SSD's write amplification calculations.

The presence of the wear leveling buffer in the DRAM and the (sometimes significant) amount of wear leveling related write data that it may queue can severely restrict the size the host write data buffer since the garbage collection buffer can also have significant amounts of data since garbage collection has been suspended mid process. With a dramatically smaller host write data buffer, the SSD's ability to accept new requests from the host is compromised which can manifest as a write uniformity deficiency of the SSD device from the perspective of the host.

Figure 4:
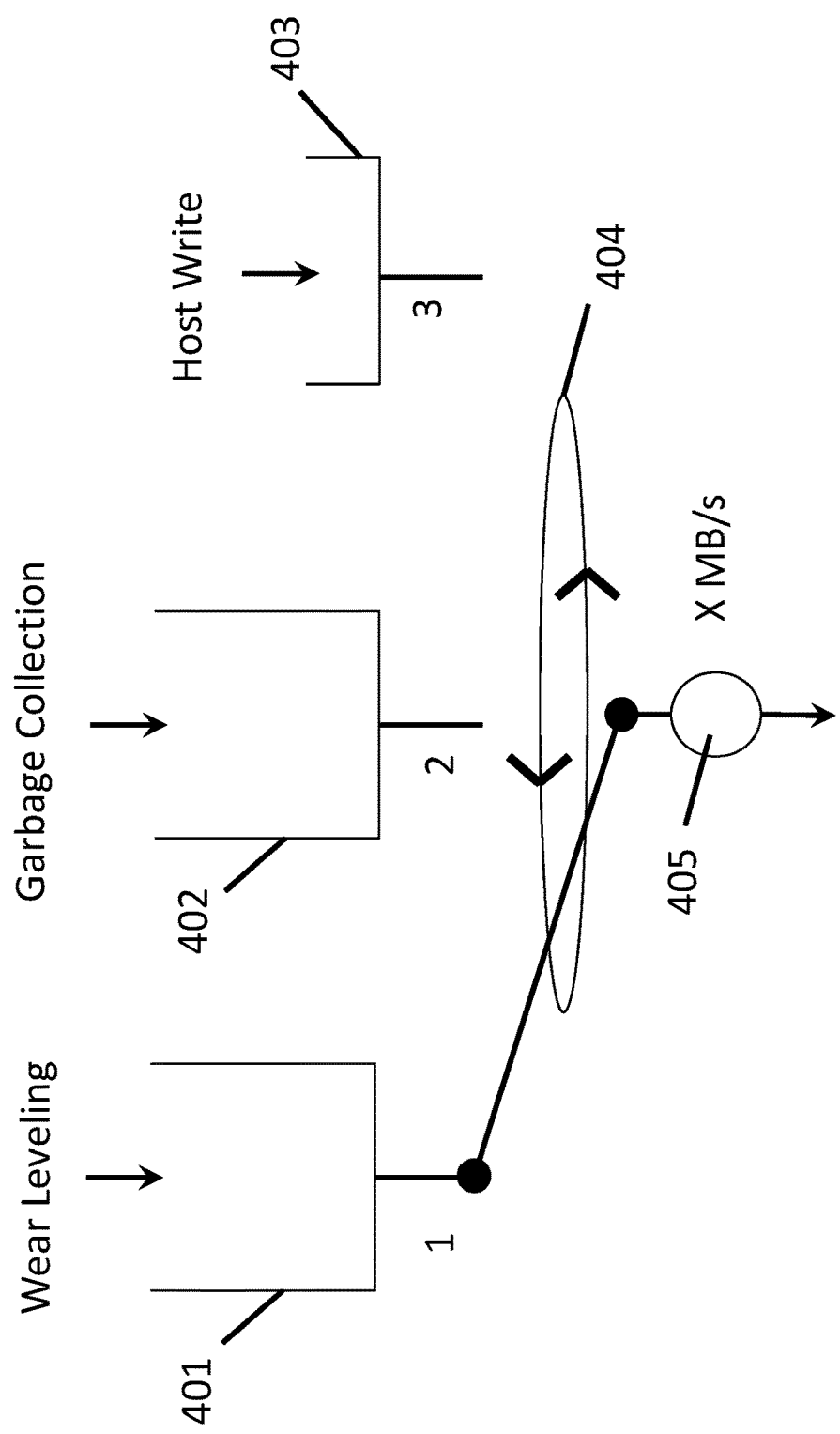
FIG. 4 shows a traditional method for queuing wear leveling, garbage collect and host write data (prior art)

FIG. 4 shows the problem more graphically. Here, the three aforementioned buffers are depicted as queues 401, 402, 403. Here, the three queues 401, 402, 403 hold the specific kind of write data each is designed to queue (the wear leveling queue 401 queues wear leveling data to be written, the garbage collection queue 402 queues garbage collection data to be written and the host write queue 403 queues write data from the queue to be written). The combined total size of all three queues 401, 402, 403 can not exceed some maximum capacity which corresponds to the internal DRAM space of the SSD device that is used to implement the queues 401, 402, 403.

The SSD device services the three queues 401, 402, 403 by effectively switching 404 its capacity 405 for performing write operations across each of the three queues 401, 402, 403 as needed. FIG. 4 shows a particularly troublesome problem in which the garbage collection process has been suspended because of a wear leveling process. With a band's worth of cold data in the wear leveling queue 401, the wear leveling queue 401 has some non negligible size. Also, with garbage collection being suspended, the garbage collection queue 402 has a significant amount of valid data waiting to be written back and so the garbage collection queue 402 has some non negligible size. With the limited capacity of the internal DRAM used to implement the buffers 401-403, there is no other option other than to restrict the size of the host write data queue 403 which leads to write uniformity problems.

Another way to conceive the problem is that for much of the run-time of the SSD device the wear-leveling queue 401 does not even exist. That is, wear-leveling is not an active process and so the SSD device need only serve the garbage collection and host write data queues 402, 403. Under these conditions write uniformity should not be a problem. However, once wear leveling is being performed and garbage collection is suspended, all three queues 401, 402, 403 have to be implemented which crowds out the size of the host write data queue 403.

Adding more over-provisioning can alleviate the problem by ensuring the capacity at which the queues are serviced 405 runs near its maximum capacity of X MB/s. That is, the bandwidth of the internal writing activity is limited by fixed maximum hardware constraints (e.g., internal clock speeds, the capacity of the data busses that are connected to the memory devices, etc.) rather than the writing activity sitting idle because there are no erased erase blocks to write to (which drops the write bandwidth to some value below X MB/s). However, as discussed above, oversubscription adds undesirable additional costs to the SSD device.

Figure 5:
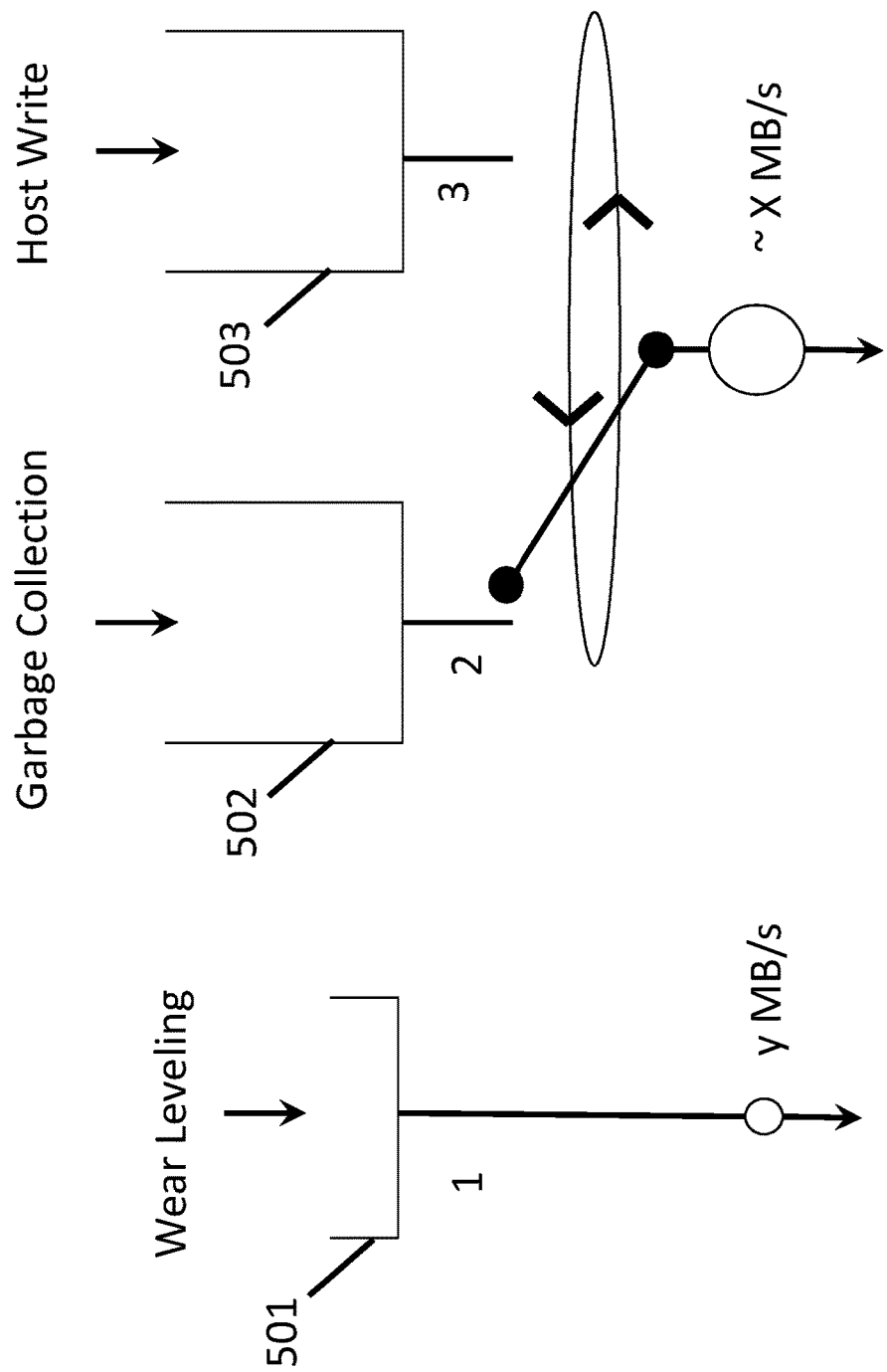
FIG. 5 shows an improved method for queuing wear leveling, garbage collect and host write data.

FIG. 5 shows an improved internal SSD management scheme that avoids the problems described just above. Here, owing to the new servicing scheme of the wear leveling, garbage collection and host write processes, the host write queue 503 should be able to maintain a respectable size/capacity which, in turn, corresponds to a reduction in write uniformity problems from the perspective of the host. Furthermore, the improved servicing scheme does not require significant over-subscription. Over-subscription percentages can remain approximately the same or possible even decrease without exposing write uniformity problems.

As observed in the new write servicing scheme of FIG. 5, some small fixed amount of the SSD device's internal write capacity (y MB/s) is dedicated to servicing the wear leveling queue 501. The remainder of the SSD device's internal write capacity is dedicated to servicing the garbage collection and host write data queues 502, 503. Here, recalling that the fixed maximum write bandwidth of the SSD device is X MB/s, the SSD device's ability to service the garbage collection and host write data queues 502, 503 is only slightly less than that (~X MB/s). More specifically, the capacity dedicated to servicing the garbage collection and host write queues 502, 503 is X−y MB/s where y is significantly smaller than X (e.g., by a factor of 10 or more).

With the wear leveling routine being constantly and continuously performed but with low write bandwidth overhead, the size of the wear leveling queue 501 can remain small. As such, the sudden simultaneous build-up of large amounts of cold data to be written and large amounts of garbage collection is avoided. More specifically, a large build-up of cold data to be written by the wear leveling process should never arise because wear-leveling associated write data is constantly and continuously being written back into the memory devices by the fixed wear leveling service rate of y MB/s. Because the sudden simultaneous build-up of large amounts of cold data to be written and large amounts of garbage collection is avoided, the host write data queue 503 constantly remains at a large enough size to avoid sever write uniformity issues.

Thus, whereas the prior art approach of FIG. 4 writes large amounts cold data relatively infrequently (large time gaps in between large cold data writes), by contrast, the new approach of FIG. 5 writes smaller amounts of cold data much more frequently (small time gaps between small cold data writes). In one design embodiment, approximately 64 KB of cold data is written every 6 milliseconds with the improved approach. By contrast, in the prior art approach, with band sizes of 8 GB, the amount of cold data could cause the wear leveling procedure to suspend garbage collection and system writes for as long as 4 seconds (i.e., wear leveling consumes 4 seconds of time) which would take place every 13 seconds.

Here, where the buffers 501, 502, 503 are implemented in internal DRAM or other type of memory space within the SSD, a controller that initiates and oversees the servicing of the queues by controlling the reading of their content from them services the wear leveling queue much more frequently than in the prior art approach in order to maintain an approximately constant service rate of y MB/s. Said another way, unlike the prior art approach in which the wear leveling queue 401 might not be present for long periods of time, by contrast, in the improved approach of FIG. 5, the wear leveling queue 501 is a substantially fixed feature in the internal DRAM resources. However the size of the wear leveling queue 501 remains only a small queue because it is continually serviced. As such the problem of crowding out the size of the host write queue does not arise.

Here, as just one example of how the improved wear leveling routine can be executed in a manner that contrasts with the prior art approach of FIGS. 3a and 3b, whereas the prior art wear leveling approach may read 302 an entire band's worth of valid information in a short time period (e.g., reading all erase blocks of the band at once or in rapid succession), by contrast, the improved approach may more slowly and deliberately (e.g., "one-at-at-time") but continuously read the content of each erase block within a band over time.

Figure 6:
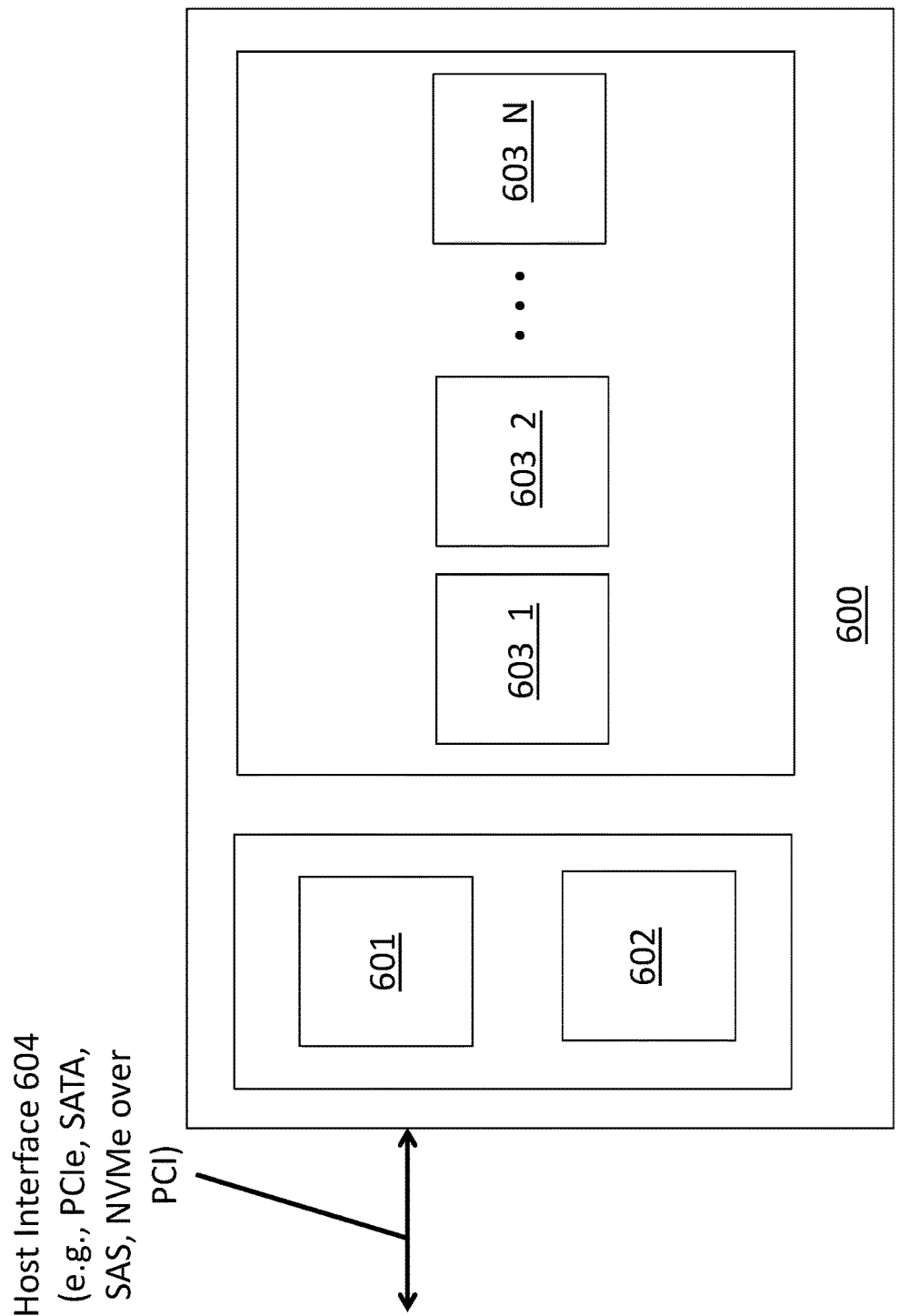
FIG. 6 shows an SSD device.

FIG. 6 shows a high level view of a SSD 600. As observed in FIG. 6, the SSD device 600 includes a controller 601, internal memory space (e.g., non volatile (e.g., DRAM) memory) 602 for the use of the controller to control the SSD device 600, and non volatile memory chips 603_1 through 603_N to store the data the SSD device 600 is requested to store by a host device. Here, the controller 601 executes firmware to perform each of the wear-leveling, garbage collection and host write processes (as well as read processes). To perform writes, data to be written is queued in queues that are effectively implemented in the internal memory space 602. The controller 601 causes the data to be serviced from these queues by reading their respective write data from the internal memory space 602 and writing the content into the non volatile memory devices 603_1 through 603_N.

In various embodiments, the firmware that the controller 601 executes is designed to continuously perform wear leveling at a low service rate so that only a small wear leveling queue is for the most part fixed in the internal memory space 602. Upon power-up of the SSD device 600, the firmware program code is loaded into the controller's program memory (which may be a partition of memory space 602). The firmware may be loaded from local on board non volatile memory space of the device (e.g., partitioned from one of the non volatile memory devices 603_1 through 603_N) and/or may receive the program code from the host via a host interface 604.

In other embodiments the controller 601 may be implemented as a dedicated hardware controller including, e.g., logic circuits designed to execute customized state machines that implement the wear-leveling, garbage collection and host write routines. In still other embodiments, the controller 601 may be implemented as a combination of circuitry that executes firmware program code and circuitry having customized logic to perform the controller's routines.

Note that the non volatile memory devices 603_1 through 603_N can be two-dimensional or three dimensional NAND memory chips. In the case of two dimensional NAND memory chips the storage cells are integrated substantially only within the two-dimensional surface area of the semiconductor substrate. By contrast, in the case of three dimensional NAND memory chips, storage cells are stacked on top of one another amongst the interconnect metallurgy that resides above the semiconductor substrate. In yet other embodiments the non volatile memory devices 603_1 through 603_N can be implemented with an emerging non volatile memory technology.

Emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging non volatile memory technologies to be used in a main system memory role rather than a traditional mass storage role (which is the traditional architectural location of non volatile storage).

Such emerging technologies may include but are not limited to, a phase change based memory, a three dimensional crosspoint memory, memory devices having storage cells composed of chalcogenide, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc Because of the faster speed of the emerging non volatile memories (e.g., as compared to traditional FLASH memory), some embodiments may even contemplate the use of the system of FIG. 6 being used for a main memory application rather than a traditional mass storage application. In this case, the system of FIG. 6 is not an SSD but a main memory device that, e.g., accepts host requests at cache line granularity rather than sector or block granularity. Here, the cache line granularity is part of an, e.g., byte addressable main memory system implementation.

Figure 7:
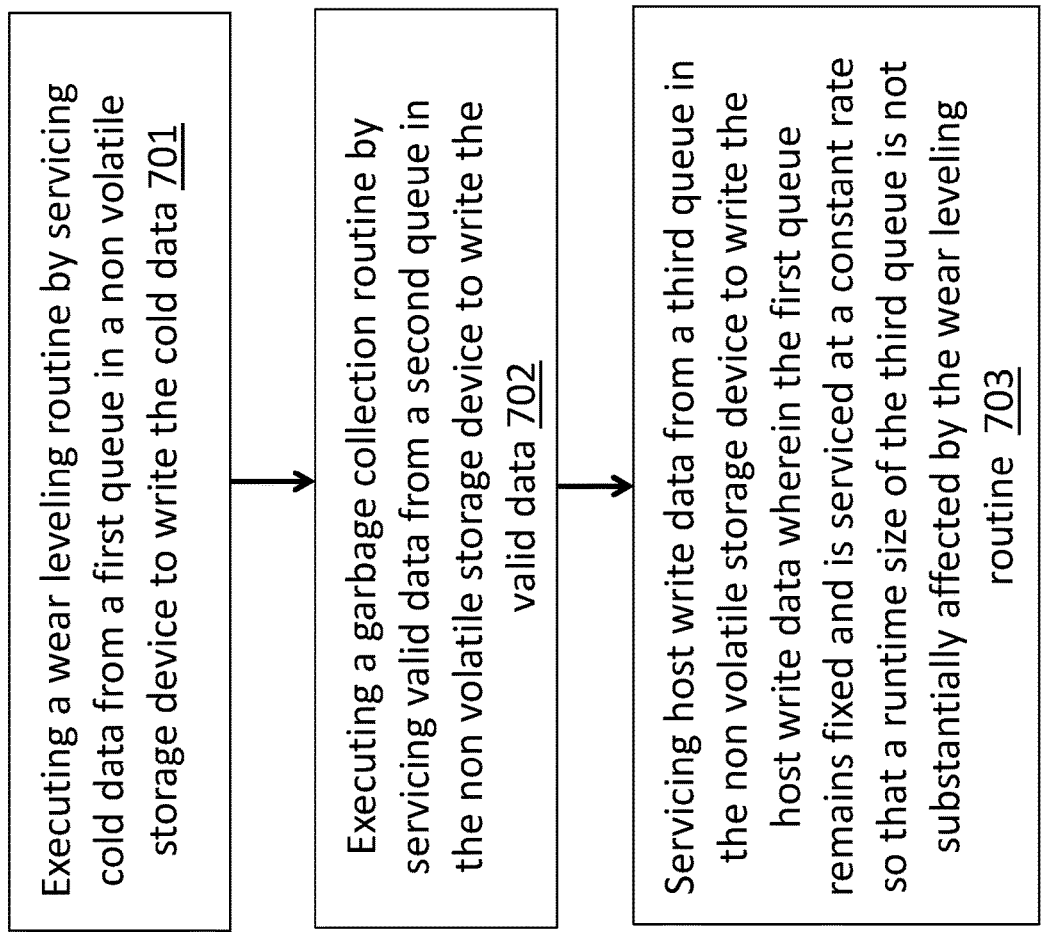
FIG. 7 shows an improved method for performing wear leveling, garbage collection and host data writing.

FIG. 7 shows a methodology performed by a storage device as described just above. According to the method of FIG. 7, the method includes executing 701 a wear leveling routine by servicing cold data from a first queue in a non volatile storage device to write the cold data. The method also includes executing 702 a garbage collection routine by servicing valid data from a second queue in the non volatile storage device to write the valid data. The method also includes servicing 703 host write data from a third queue in the non volatile storage device to write the host write data wherein the first queue remains fixed and is serviced at a constant rate so that a runtime size of the third queue is not substantially affected by the wear leveling routine.

Figure 8:
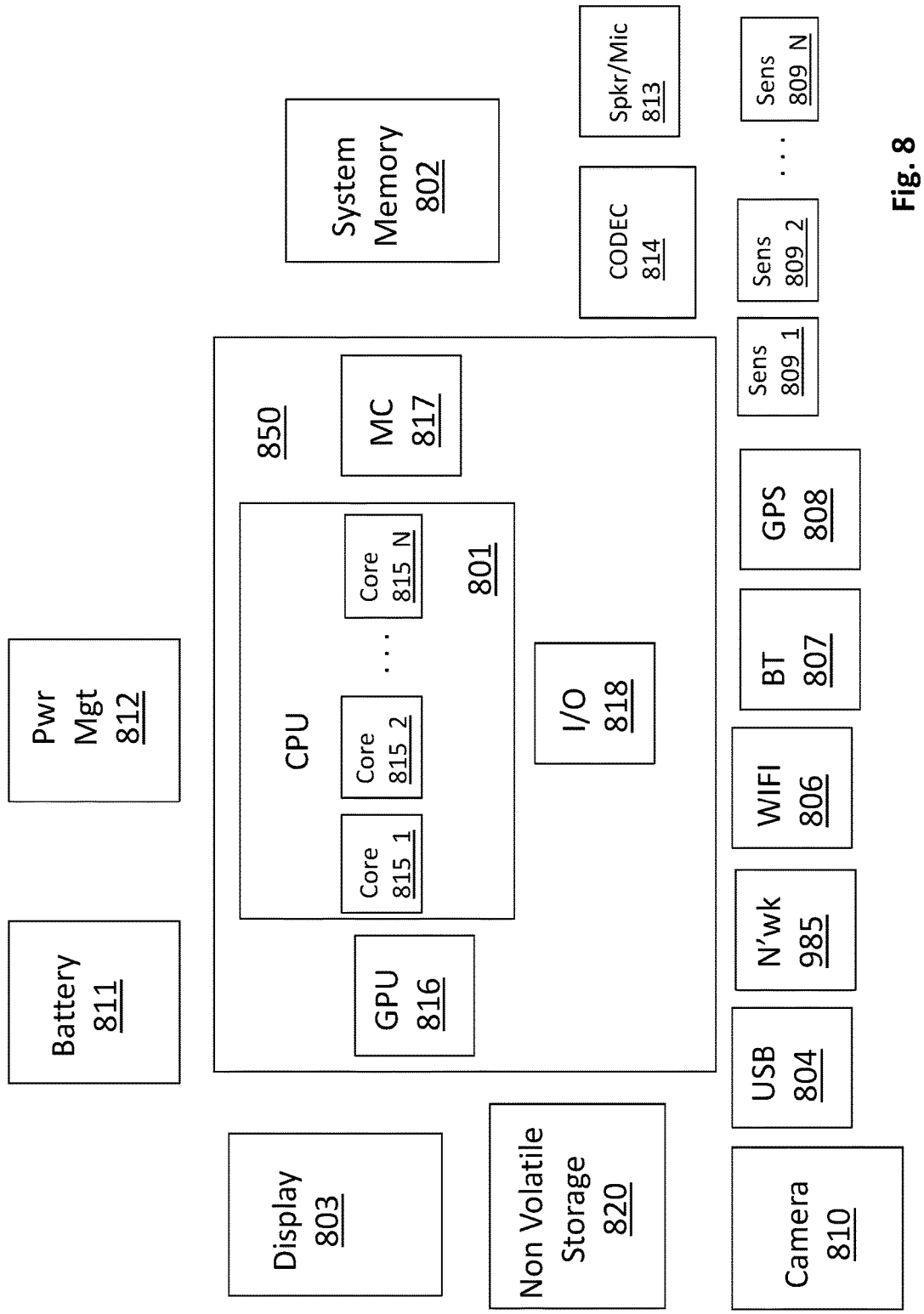
FIG. 8 shows a computing system.

FIG. 8 shows a depiction of an exemplary computing system 800 such as a personal computing system (e.g., desktop or laptop) or a mobile or handheld computing system such as a tablet device or smartphone, or, a larger computing system such as a server computing system. In the case of a large computing system, various one or all of the components observed in FIG. 8 may be replicated multiple times to form the various platforms of the computer which are interconnected by a network of some kind.

As observed in FIG. 8, the basic computing system may include a central processing unit 801 (which may include, e.g., a plurality of general purpose processing cores and a main memory controller disposed on an applications processor or multi-core processor), system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N (e.g., one or more of a gyroscope, an accelerometer, a magnetometer, a temperature sensor, a pressure sensor, a humidity sensor, etc.), a camera 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a memory management function 817 (e.g., a memory controller) and an I/O control function 818. The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802.

Each of the touchscreen display 803, the communication interfaces 804-807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the camera 810). Depending on implementation, various ones of these I/O components may be integrated on the applications processor/multi-core processor 850 or may be located off the die or outside the package of the applications processor/multi-core processor 850.

The system also includes non volatile storage 820 which, e.g., can further broken into firmware BIOS storage and traditional mass storage. Here, the aforementioned SSD device can be used for either of these non volatile storage 820 applications. Further still, the overall system of FIG. 6 as described above can also be conceivably used as a component of main memory 802.

Embodiments of the invention may include various processes as set forth above. The processes may be embodied in machine-executable instructions. The instructions can be used to cause a general-purpose or special-purpose processor (e.g., a controller) to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), digital signal processors (DSP), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A non-transitory machine readable storage medium containing program code that when processed by a processor causes a method to be performed, the method comprising:
    executing a wear leveling routine by servicing cold data from a first queue in a non-volatile storage device to write the cold data;
    executing a garbage collection routine by servicing valid data from a second queue in the non-volatile storage device to write the valid data; and,
    servicing host write data from a third queue in the non-volatile storage device to write the host write data wherein:
    the first, second, and third queues are implemented in a common memory;
    a total maximum servicing bandwidth of the first, second and third queues is X MB/s;
    a first amount of servicing bandwidth y is assigned to the first queue;
    a remaining amount of servicing bandwidth is assigned to the second and third queues such that a total maximum servicing bandwidth of the second and third queues is (X−y) MB/s; and
    y is fixed to prevent expansion of a first size of the first queue at the expense of a second size of the third queue thereby allowing the third queue to receive requests from a host at a constant rate over time.

2. The non-transitory machine readable storage medium of claim 1 wherein the non-volatile storage device is a solid state disk (SSD) device.

3. The non-transitory machine readable storage medium of claim 1 wherein the method further comprises changing a size of the second and third queues as a function of a write amplification determination.

4. The non-transitory machine readable storage medium of claim 1 wherein the common memory is local to the non-volatile storage device.

5. The non-transitory machine readable storage medium of claim 4 wherein the common memory comprises dynamic random access memory (DRAM).

6. The non-transitory machine readable storage medium of claim 1 wherein the non-volatile storage device comprises FLASH non-volatile memory devices.

7. The non-transitory machine readable storage medium of claim 1 wherein the non-volatile storage device comprises three dimensional non-volatile memory devices.

8. An apparatus, comprising:
a non-volatile storage device comprising a) and b) below:
    a) a plurality of non-volatile memory devices;
    b) controller circuitry, the controller circuitry to perform the following:
execute a wear leveling routine by servicing cold data from a first queue in a non-volatile storage device to write the cold data;
execute a garbage collection routine by servicing valid data from a second queue in the non-volatile storage device to write the valid data; and,
service host write data from a third queue in the non-volatile storage device to write the host write data wherein:
the first, second, and third queues are implemented in a common memory;
a total maximum servicing bandwidth of the first, second and third queues is X MB/s;
a first amount of servicing bandwidth y is assigned to the first queue;
a remaining amount of servicing bandwidth is assigned to the second and third queues such that a total maximum servicing bandwidth of the second and third queues is (X−y) MB/s; and
y is fixed to prevent expansion of a first size of the first queue at the expense of a second size of the third queue thereby allowing the third queue to receive requests from a host at a constant rate over time.

9. The apparatus of claim 8 wherein the non-volatile storage device is a solid state disk (SSD) device.

10. The apparatus of claim 8 wherein the controller is to change a size of the second and third queues as a function of a write amplification determination.

11. The apparatus of claim 8 wherein the common memory is local to the non-volatile storage device.

12. The apparatus of claim 11 wherein the common memory comprises dynamic random access memory (DRAM).

13. The apparatus of claim 8 wherein the non-volatile storage device comprises FLASH non-volatile memory devices.

14. The apparatus of claim 8 wherein the non-volatile storage device comprises three dimensional non-volatile memory devices.

15. A computing system, comprising:
a plurality of processing cores;
a networking interface;
a non-volatile storage device comprising a) and b) below:
    a) a plurality of non-volatile memory devices;
    b) controller circuitry, the controller circuitry to perform the following:
execute a wear leveling routine by servicing cold data from a first queue in a non-volatile storage device to write the cold data;
execute a garbage collection routine by servicing valid data from a second queue in the non-volatile storage device to write the valid data; and,
service host write data from a third queue in the non-volatile storage device to write the host write data wherein:
the first, second, and third queues are implemented in a common memory;
a total maximum servicing bandwidth of the first, second and third queues is X MB/s;
a first amount of servicing bandwidth y is assigned to the first queue;
a remaining amount of servicing bandwidth is assigned to the second and third queues such that a total maximum servicing bandwidth of the second and third queues is (X−y) MB/s; and
y is fixed to prevent expansion of a first size of the first queue at the expense of a second size of the third queue thereby allowing the third queue to receive requests from a host at a constant rate over time.

16. The computing system of claim 15 wherein the non-volatile storage device is a solid state disk (SSD) device.

17. The computing system of claim 15 wherein the controller is 10 change a size of the second and third queues as a function of a write amplification determination.

18. The computing system of claim 15 wherein the common memory is local to the non-volatile storage device.

19. The computing system of claim 15 wherein the non-volatile storage device comprises FLASH non-volatile memory devices.

20. The computing system of claim 15 wherein the non-volatile storage device comprises three dimensional non-volatile memory devices.

* * * * *